United States Patent
Baysinger, Jr. et al.

(10) Patent No.: US 6,601,576 B1
(45) Date of Patent: Aug. 5, 2003

(54) BOTTLE WARMING APPARATUS

(76) Inventors: Kenneth E. Baysinger, Jr., 3418 E. 87$^{th}$ St., Tulsa, OK (US) 74137; Shannon G. Baysinger, 7654 E. Greenway Dr., Claremore, OK (US) 74017

( * ) Notice: Subject to any disclaimer, the term of this patent is extended or adjusted under 35 U.S.C. 154(b) by 0 days.

(21) Appl. No.: 10/099,015

(22) Filed: Mar. 15, 2002

(51) Int. Cl.$^7$ ................................................. F24J 3/00
(52) U.S. Cl. ................................................. 126/263.06
(58) Field of Search ........................... 122/21; 362/202; 252/70; 426/113; 248/102; 126/263.01, 263.05, 263.08, 263.09

(56) References Cited

U.S. PATENT DOCUMENTS

| | | |
|---|---|---|
| 4,573,447 A | 3/1986 | Thrash et al. |
| 4,754,379 A * | 6/1988 | Kelley ........................ 362/202 |
| 4,762,113 A | 8/1988 | Hamasaki |
| 4,895,135 A | 1/1990 | Hamasaki |
| D308,154 S | 5/1990 | Tow |
| 5,042,455 A | 8/1991 | Yue et al. |
| 5,624,090 A | 4/1997 | Gammelgaard |
| 6,248,257 B1 * | 6/2002 | Bell et al. ...................... 252/70 |

* cited by examiner

Primary Examiner—Henry Bennett
Assistant Examiner—Sabrina Dagostino

(57) ABSTRACT

A bottle warming apparatus for use while traveling or doing outdoor activities. The bottle warming apparatus includes a tubular main member having an open end, closed end and an interior perimeter wall positioned such that the interior perimeter wall and the closed end define a bottle holding space designed for snugly receiving a bottle, the main member also includes an outer perimeter wall positioned in spaced relationship with the interior perimeter wall; a fluid positioned in the interior space; a frangible bubble positioned in the interior space, a pellet positioned in the frangible bubble which causes an exothermic reaction when the pellet contacts the fluid when the frangible bubble is broken; the outer perimeter wall is flexible to permit squeezing of the interior space to break the frangible bubble causing the fluid contacts and the pellet to initiate the exothermic reaction heating the bottle positioned in the bottle holding space.

5 Claims, 1 Drawing Sheet

BOTTLE WARMING APPARATUS

BACKGROUND OF THE INVENTION

1. Field of the Invention

The present invention relates to self heating containers and more particularly pertains to a new bottle warming apparatus for warming bottles while traveling, doing outdoor activities or away from home.

2. Description of the Prior Art

The use of self heating containers is known in the prior art. More specifically, self heating containers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,895,135; 4,762,113; U.S. Pat. No. Des. 308,154; U.S. Pat. Nos. 5,624,090; 5,042,455; and 4,573,447.

While these devices fulfill their respective, particular objectives and requirements, the aforementioned patents do not disclose a new bottle warming apparatus. The inventive device includes a tubular main member having an open end, a closed end and an interior perimeter wall positioned such that the interior perimeter wall and the closed end define a bottle holding space designed for snugly receiving a bottle, the main member also includes an outer perimeter wall positioned in spaced relationship with the interior perimeter wall; a fluid positioned in the interior space; a frangible bubble positioned in the interior space, a pellet positioned in the frangible bubble which causes an exothermic reaction when the pellet contacts the fluid when the frangible bubble is broken; the outer perimeter wall is flexible to permit squeezing of the interior space to break the frangible bubble causing the fluid contacts and the pellet to initiate the exothermic reaction heating the bottle positioned in the bottle holding space.

In these respects, the bottle warming apparatus according to the present invention substantially departs from the conventional concepts and designs of the prior art, and in so doing provides an apparatus primarily developed for the purpose of warming bottles while traveling, doing outdoor activities or away from home.

SUMMARY OF THE INVENTION

In view of the foregoing disadvantages inherent in the known types of self heating containers now present in the prior art, the present invention provides a new bottle warming apparatus construction wherein the same can be utilized for warming bottles while traveling, doing outdoor activities or away from home.

The general purpose of the present invention, which will be described subsequently in greater detail, is to provide a new bottle warming apparatus apparatus and method which has many of the advantages of the self heating containers mentioned heretofore and many novel features that result in a new bottle warming apparatus which is not anticipated, rendered obvious, suggested, or even implied by any of the prior art self heating containers, either alone or in any combination thereof.

To attain this, the present invention generally comprises a tubular main member having an open end, a closed end and an interior perimeter wall positioned such that the interior perimeter wall and the closed end define a bottle holding space designed for snugly receiving a bottle, the main member also includes an outer perimeter wall positioned in spaced relationship with the interior perimeter wall; a fluid positioned in the interior space; a frangible bubble positioned in the interior space, a pellet positioned in the frangible bubble which causes an exothermic reaction when the pellet contacts the fluid when the frangible bubble is broken; the outer perimeter wall is flexible to permit squeezing of the interior space to break the frangible bubble causing the fluid contacts and the pellet to initiate the exothermic reaction heating the bottle positioned in the bottle holding space.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new bottle warming apparatus apparatus and method which has many of the advantages of the self heating containers mentioned heretofore and many novel features that result in a new bottle warming apparatus which is not anticipated, rendered obvious, suggested, or even implied by any of the prior art self heating containers, either alone or in any combination thereof.

It is another object of the present invention to provide a new bottle warming apparatus which may be easily and efficiently manufactured and marketed.

It is a further object of the present invention to provide a new bottle warming apparatus which is of a durable and reliable construction.

An even further object of the present invention is to provide a new bottle warming apparatus which is susceptible of a low cost of manufacture with regard to both materials and labor, and which accordingly is then susceptible of low prices of sale to the consuming public, thereby making such bottle warming apparatus economically available to the buying public.

Still yet another object of the present invention is to provide a new bottle warming apparatus which provides in the apparatuses and methods of the prior art some of the advantages thereof, while simultaneously overcoming some of the disadvantages normally associated therewith.

Still another object of the present invention is to provide a new bottle warming apparatus for warming bottles while traveling, doing outdoor activities or away from home.

Yet another object of the present invention is to provide a new bottle warming apparatus which includes a tubular main member having an open end, a closed end and an interior perimeter wall positioned such that the interior perimeter wall and the closed end define a bottle holding space designed for snugly receiving a bottle, the main member also includes an outer perimeter wall positioned in spaced relationship with the interior perimeter wall; a fluid positioned in the interior space; a frangible bubble positioned in the interior space, a pellet positioned in the frangible bubble which causes an exothermic reaction when the pellet contacts the fluid when the frangible bubble is broken; the outer perimeter wall is flexible to permit squeezing of the interior space to break the frangible bubble causing the fluid contacts and the pellet to initiate the exothermic reaction heating the bottle positioned in the bottle holding space.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
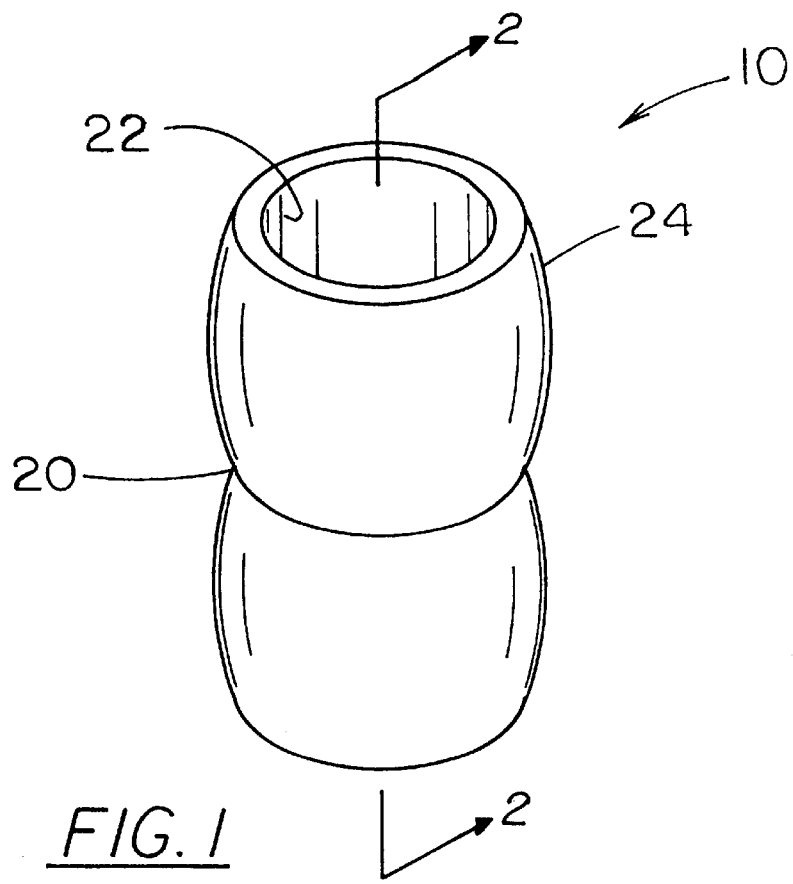
FIG. 1 is a schematic perspective view of a new bottle warming apparatus according to the present invention.
Figure 2:
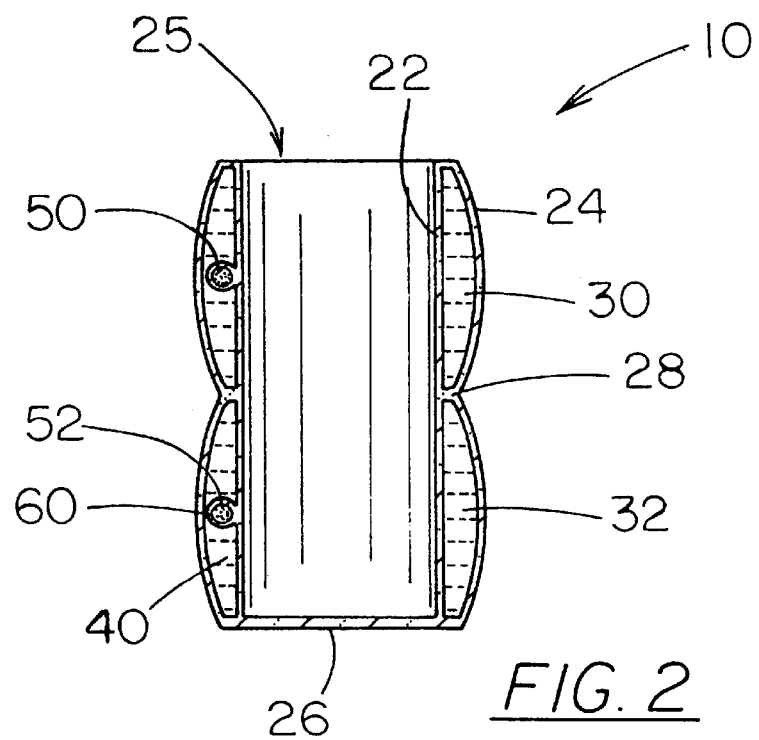
FIG. 2 is a schematic cross-sectional view of the present invention.

With reference now to the drawings, and in particular to FIGS. 1 through 2 thereof, a new bottle warming apparatus embodying the principles and concepts of the present invention and generally designated by the reference numeral 10 will be described.

As best illustrated in FIGS. 1 through 2, the bottle warming apparatus 10 generally comprises a tubular main member 20, a fluid 40, and a frangible bubble 50.

The tubular main member 20 includes an open end 25 and a closed end 26. Additionally, the tubular main member 20 includes an interior perimeter wall 22 positioned such that the interior perimeter wall 22 and the closed end 26 define a bottle holding space designed for snugly receiving a bottle. The main member 20 also includes an outer perimeter wall 24 positioned in spaced relationship with the interior perimeter wall 22. Preferably, a top of the outer perimeter wall 24 is joined to a top of the interior perimeter wall 22 to define an interior space between the interior perimeter wall 22 and the outer perimeter wall 24.

The fluid 40 is positioned in the interior space. Similarly, the frangible bubble 50 is positioned in the interior space. A pellet 60 is positioned in the frangible bubble 50. The pellet 60 causes an exothermic reaction when the pellet 60 contacts the fluid 40 when the frangible bubble 50 is broken.

The outer perimeter wall 24 is flexible to permit squeezing of the interior space to break the frangible bubble 50. Thus, the fluid 40 contacts the pellet 60 to initiate the exothermic reaction. Thus, the main member 20 is designed for heating the bottle positioned in the bottle holding space.

A dividing wall 28 extends between the interior perimeter wall 22 and the outer perimeter wall 24 to divide the interior space into an upper interior space 30 and a lower interior space 32.

In a preferred embodiment, the frangible bubble 50 is a first frangible bubble 50. The first frangible bubble 50 is positioned in the upper interior space 30. A second frangible bubble 52 is positioned in the lower interior space 32. A second pellet 60 is positioned in the second frangible bubble 52. The second pellet 60 also causes an exothermic reaction when the second pellet 60 contacts the fluid 40 when the second frangible bubble 52 is broken. The frangible bubbles 50,52 are preferably coupled to the interior perimeter wall 22.

In a further embodiment the fluid 50 is water and the pellet 60 is comprised of calcium chloride.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A bottle warming apparatus comprising:

a tubular main member having an open end and a closed end;

said tabular main member having an interior perimeter wall positioned such that said interior perimeter wall and said closed end define a bottle holding space adapted for snugly receiving a bottle;

said main member having an outer perimeter wall positioned in spaced relationship with said interior perimeter wall, a top of said outer perimeter wall being joined to a top of said interior perimeter wall to define an interior space between said interior perimeter wall and said outer perimeter wall;

a fluid positioned in said interior space;

a frangible bubble positioned in said interior space, a pellet positioned in said frangible bubble, said pellet causing an exothermic reaction when said pellet contacts said fluid when said frangible bubble is broken;

said outer perimeter wall being flexible to permit squeezing of said interior space to break said frangible bubble whereby said fluid contacts said pellet to initiate said exothermic reaction whereby said main member is adapted for heating the bottle positioned in said bottle holding space;

a dividing wall extending between said interior perimeter wall and said outer perimeter wall to divide said interior space into an upper interior space and a lower interior space;

said frangible bubble being a first frangible bubble, said first frangible bubble being positioned in said upper interior space;

a second frangible bubble said second frangible bubble being positioned in said lower interior space; and a second pellet, said second pellet being positioned in said second frangible bubble said second pellet causing an exothermic reaction when said second pellet contacts said fluid when said second frangible bubble is broken.

2. The bottle warming apparatus of claim 1, further comprising:

said frangible bubble being coupled to said interior perimeter wall.

3. The bottle warming apparatus of claim 1, further comprising:

said first frangible bubble being coupled to said interior perimeter wall; and said second frangible bubble being coupled to said interior perimeter wall.

4. The bottle warming apparatus of claim 1 wherein said fluid is water and said pellet is comprised of calcium chloride.

5. A bottle warming apparatus comprising:

a tubular main member having an open end and a closed end;

said tubular main member having an interior perimeter wall positioned such that said interior perimeter wall and said closed end define a bottle holding space adapted for snugly receiving a bottle;

said main member having an outer perimeter wall positioned in spaced relationship with said interior perimeter wall, a top of said outer perimeter wall being joined to a top of said interior perimeter wall to define an interior space between said interior perimeter wall and said outer perimeter wall;

a fluid positioned in said interior space;

a frangible bubble positioned in said interior space, a pellet positioned in said frangible bubble, said pellet causing an exothermic reaction when said pellet contacts said fluid when said frangible bubble is broken;

said outer perimeter wall being flexible to permit squeezing of said interior space to break said frangible bubble whereby said fluid contacts said pellet to initiate said exothermic reaction whereby said main member is adapted for heating the bottle positioned in said bottle holding space;

a dividing wall extending between said interior perimeter wall and said outer perimeter wall to divide said interior space into an upper interior space and a lower interior space;

said frangible bubble being a first frangible bubble, said first frangible bubble being positioned in said upper interior space;

a second frangible bubble, said second frangible bubble being positioned in said lower interior space;

a second pellet, said second pellet being positioned in said second frangible bubble, said second pellet causing an exothermic reaction when said second pellet contacts said fluid when said second frangible bubble is broken;

said frangible bubble being coupled to said interior perimeter wall;

said first frangible bubble being coupled to said interior perimeter wall;

said second frangible bubble being coupled to said interior perimeter wall; and wherein said fluid is water and said pellet is comprised of calcium chloride.

* * * * *